United States Patent [19]

Parker

[11] Patent Number: 5,058,407
[45] Date of Patent: Oct. 22, 1991

[54] LEVEL FOR USE IN BENDING CONDUIT
[75] Inventor: Charles H. Parker, Portland, Oreg.
[73] Assignee: Duit Level Co., Portland, Oreg.
[21] Appl. No.: 334,894
[22] Filed: Apr. 7, 1989
[51] Int. Cl.⁵ ............................................. B21C 51/00
[52] U.S. Cl. ......................................... 72/37; 72/369; 72/459; 33/371
[58] Field of Search ................... 72/37, 458, 459, 369, 72/372; 33/371

[56] References Cited
U.S. PATENT DOCUMENTS

| | | | |
|---|---|---|---|
| 2,419,941 | 5/1947 | Belzung | 33/371 |
| 2,824,381 | 2/1958 | Traupmann | 33/371 |
| 2,842,863 | 7/1958 | Hellwig | 33/371 |
| 2,932,225 | 4/1960 | Gardner | 72/459 |
| 4,274,208 | 6/1981 | Yakkel | 33/371 |
| 4,394,799 | 7/1983 | Moree et al. | 33/371 |
| 4,589,213 | 5/1986 | Woodward | 33/371 |
| 4,622,837 | 11/1986 | Bergman | 72/459 |

OTHER PUBLICATIONS

Greenlee Textron Inc., pamphlet entitled, *Techniques of Radius Conduit and Pipe Bending On-the-Job*, Dec., 1988.
Greenlee Textron Inc. catalog, pp. 12 and 18, front and back covers, dated Feb., 1988.
Greenlee Textron Inc., *Conduit Bending Handbook*, Aug., 1988.
*IBEW Journal*, "Helpful Invention", Mar. 1989, p. 38.

Primary Examiner—David Jones
Attorney, Agent, or Firm—Marger, Johnson, McCollom & Stolowitz, Inc.

[57] ABSTRACT

A conduit level for use in bending electrical conduit includes a generally F-shape rigid frame having a base member and a pair of legs and a clamping screw protruding through one of the legs for connecting the frame to an open end of a conduit. A bubble level is housed within a bottom end portion of the base member so that, when the apparatus is connected to the conduit, the bubble level is laterally spaced apart from the open end of the conduit to bring it into view of an operator from an operator's position alongside the conduit for leveling the conduit. A housing is integrally formed in the bottom end portion to substantially surround the bubble level to protect it from impact. The housing includes windows on four sides to allow viewing the bubble level from the operator's position after a bend is formed in the conduit.

12 Claims, 3 Drawing Sheets

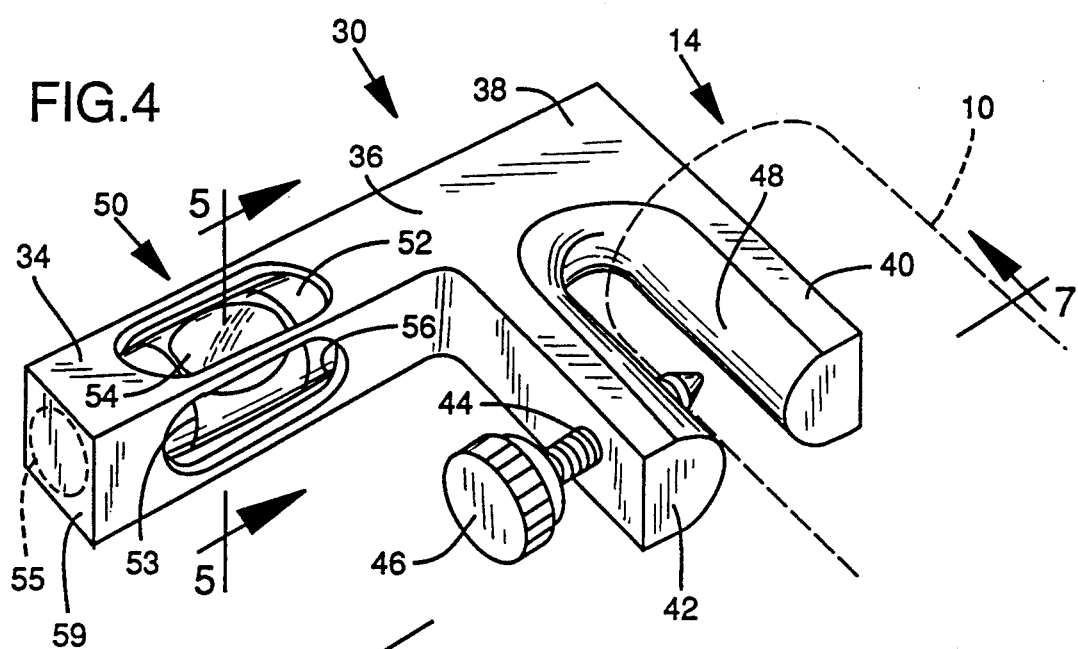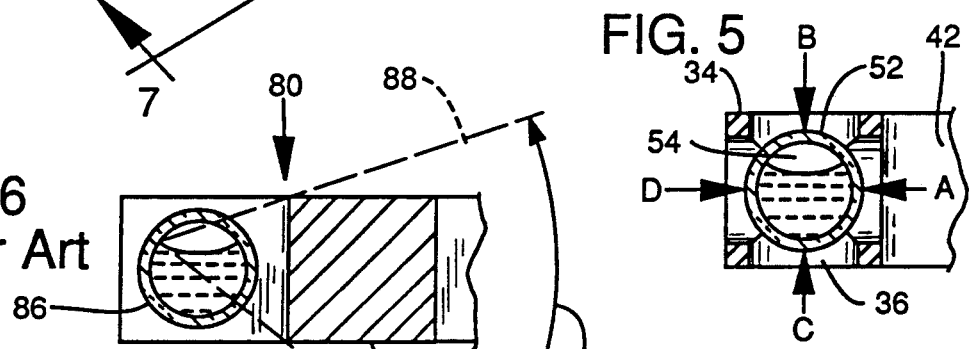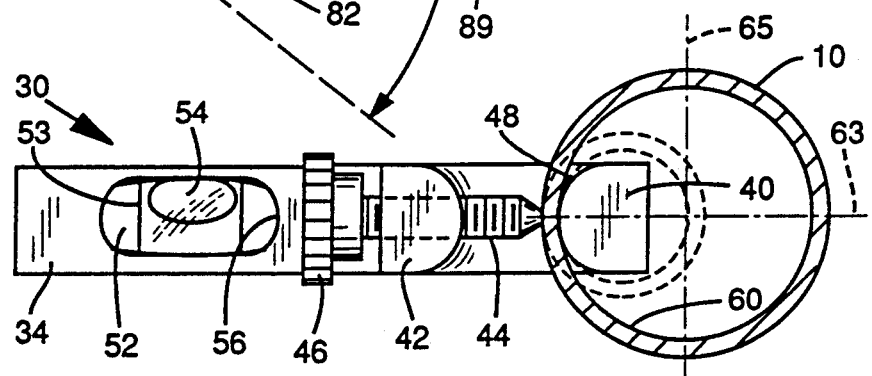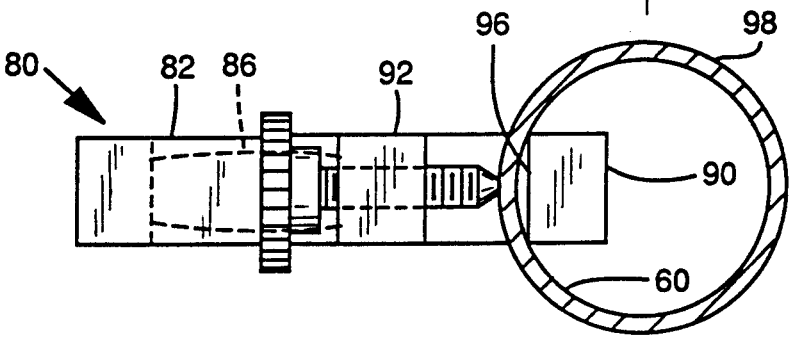

LEVEL FOR USE IN BENDING CONDUIT

BACKGROUND OF THE INVENTION

This invention relates to the field of electrical conduit installation and, more particularly, to apparatus and methods for bending electrical conduit.

In many conduit applications, local building codes require that wires, particularly electrical wires, be enclosed in pipes or conduit, primarily for safety reasons. Various types of conduit are used for this purpose including EMT (Electrical Metallic Tubing), also called "thinwall"; IMC (Intermediate Metallic Conduit), a thicker material assembled with threaded couplers; and "Rigid," the heaviest conduit generally used in electrical work. All of these conduits are made of a metal such as aluminum or steel.

Conduit is sold commercially in straight pieces of various lengths. In the course of installing conduit in or along a wall, it is necessary to bend the conduit to avoid doorways, ducting and other obstructions. An electrician can bend small-diameter, thinwall conduit by hand. Bending heavier conduit requires a bending machine. Various bending machines are known, including mechanical, hydraulic and electric models. Mechanical bending machines are used most frequently because they are adequate for bending pipe up to 1½ to 2 inches OD and they are less expensive than powered machines.

A common conduit bending task is to form an "offset", i.e., a pair of equal and opposite bends in a length of conduit such that the end portions of the conduit are parallel to, but offset from, each other. For example, where a conduit is to be installed horizontally in a wall, but a vent obstructs its path, an offset would be formed in the conduit so that, when installed, it passes by—either above or below—the obstruction, and resumes a horizontal orientation.

Another conduit bending task is to form a "saddle". A saddle consists of a first offset and a complementary offset, equal and opposite to the first offset. The saddle thus includes four bends, arranged such that a U-shaped detour is formed in the conduit to circumvent an obstruction.

It is critical that offsets and saddles be formed such that the entire length of the bent conduit lies in a plane so that, upon installation, the conduit fits inside or flush against the wall. If any bend after the first bend is made improperly, a section of the conduit will extend outside the plane. Such an errant section of pipe is known as a "wow" or "dogleg".

Conduit bending may be done on elaborate and expensive "bending tables". Simpler bending machines also may be used, but all bending machines require "leveling" the conduit in the bending machine to form an offset or a saddle. "Leveling" means rotationally positioning the pipe relative to a reference plane, for example a horizontal plane, prior to forming each bend. One method of leveling a conduit is sometimes called "Eyeballing". As the name implies, the operator simply uses his naked eyesight to view the bend after it is made to determine if a level position has been achieved. The method requires the operator to "eyeball" the bend from various angles and therefore is time consuming. Accuracy depends solely upon the skill of the operator and can be extremely poor if the operator's skills are low. Material loss and labor expense using this method can be very high.

Another known leveling method requires assembling a pair of locking pliers (for example, Vise-Grips), a length of square channel ("Kindorf") stock, and a magnetic torpedo-type level. The operator applies the locking pliers to attach the channel stock to an open end of the conduit pipe to be bent. The magnetic torpedo level is then (magnetically) attached to the channel stock. The operator views the torpedo level to aid him or her in leveling the conduit relative to a horizontal plane.

The foregoing method is time consuming and unreliable. The orientation of the three detachable parts is critical, so that if any of them is bumped while bending the conduit, a dogleg is likely to result. The locking pliers are not a stable attachment means because the plier jaws do not fittingly engage the inside contour of the pipe to be bent. An inaccurate bend can result if the pliers shift during the bending process.

Another problem with this makeshift level is that the bubble level indicator in the torpedo level is not clearly visible from the position from which the operator makes the bends. The operator must move around the bending machine and the pipe being bent to adjust for level. These added footsteps increase the time required for bending.

A variation on the torpedo level theme requires fashioning a special tool by welding a metal plate perpendicular to the stable arm of a pair of locking pliers. The modified pliers are clamped onto the end of the conduit pipe to be bent, and a magnetic torpedo level is positioned on the metal plate. This makeshift leveling device is used in a manner similar to the three-part device described above. Like the three-part apparatus, the welded-plate pliers do not fit the inside contour of the pipe to be bent, thus leading to an unstable attachment. Second, this level is bulky and heavy and therefore difficult to use. Finally, as with the Kindorf channel (three-piece) device, the bubble which the operator uses to judge level is not clearly visible from the position from which the operator makes the bends, again slowing the electrician's work.

Another level known for use in conduit bending is one available from the Off-Set Level Company of Ventura, California, hereinafter referred to as the "OLC device". The OLC device is similar to FIG. 2 of the drawing. The OLC device suffers shortcomings similar to the other apparatus described above in that the bubble level indicator in the OLC device is not clearly visible to the operator during all phases of a bending operation. Accordingly, it too requires the operator frequently to move about in order to check for level positioning of the conduit preparatory to bending. Additionally, the OLC device's bubble level indicator is exposed and therefore subject to being damaged or knocked out of alignment if bumped. The result is increased tool expense, unreliable results and lost time. Finally, the means for attaching the OLC device to the conduit does not fit the interior contour of the pipe, thus making it unstable and causing inaccurate results.

SUMMARY OF THE INVENTION

It is an object of the present invention to provide methods and apparatus for assisting an operator in fast, easy and accurate conduit bending, including especially bending offsets and saddles.

Another object of the invention is to minimize costly electrician time spent bending offsets and saddles in a conduit by allowing the electrician to level the conduit from an affixed operator's position rather than moving to an alternate viewing position.

Another object of the invention is to provide for simple yet secure attachment of a conduit level to a conduit to ensure accurate bending.

A further object of the invention is to protect the conduit leveling apparatus from damage in order to avoid undue expense and time loss on the job.

According to the present invention, an apparatus for use in bending a conduit includes a generally F-shape rigid frame. The frame includes a base member having a bottom end portion, an intermediate portion and a top end. The frame is formed of a sturdy, lightweight material, preferably aluminum.

A first leg is fixed to the base member adjacent the top end and extending perpendicular to the base member. A second leg is fixed to the base member adjacent the intermediate portion, extending parallel to the first leg and spaced apart therefrom for receiving a terminal portion of the wall of the conduit between the first and second legs.

A bubble level indicator for visually indicating a horizontal plane is located within the bottom end portion of the frame so that, when the apparatus is connected to the conduit, the level indicator is laterally spaced apart from the open end of the conduit so as to be unobscured by the second leg and the intermediate portion of the frame.

The bubble level indicator includes a transparent cylindrical vial containing a fluid and a bubble. A housing is integrally formed in the bottom end portion of the frame and arranged to surround the vial to protect it from impact. The housing includes at least one window for viewing the central portion of the vial, when the apparatus is connected to the conduit, from an operator's position generally alongside the conduit and remote from the open end.

A clamping member adjustably extends through the second leg toward the first leg for connecting the apparatus to the conduit. The first leg includes a convex mounting surface so that, in use, the clamping member urges the conduit wall against the first leg whereby the interior surface of the conduit fittingly engages the convex mounting surface for connecting the apparatus to the conduit.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 4 is an enlarged perspective view of the conduit level of FIG. 1 showing the open end portion of the conduit in phantom.

FIG. 5 is a cross sectional view taken along line 5—5 of FIG. 4.

FIG. 6 is a cross sectional view of the prior art conduit level of FIG. 2., showing in dashed lines the field of view of the bubble level indicator.

FIG. 7 is an end view of the conduit level and conduit of FIG. 1 generally as seen from a bending operator's position.

FIG. 8 is an end view of the prior art conduit level of FIG. 2 installed on a conduit as seen from a bending operator's position.

DETAILED DESCRIPTION OF A PREFERRED EMBODIMENT

Figure 1:
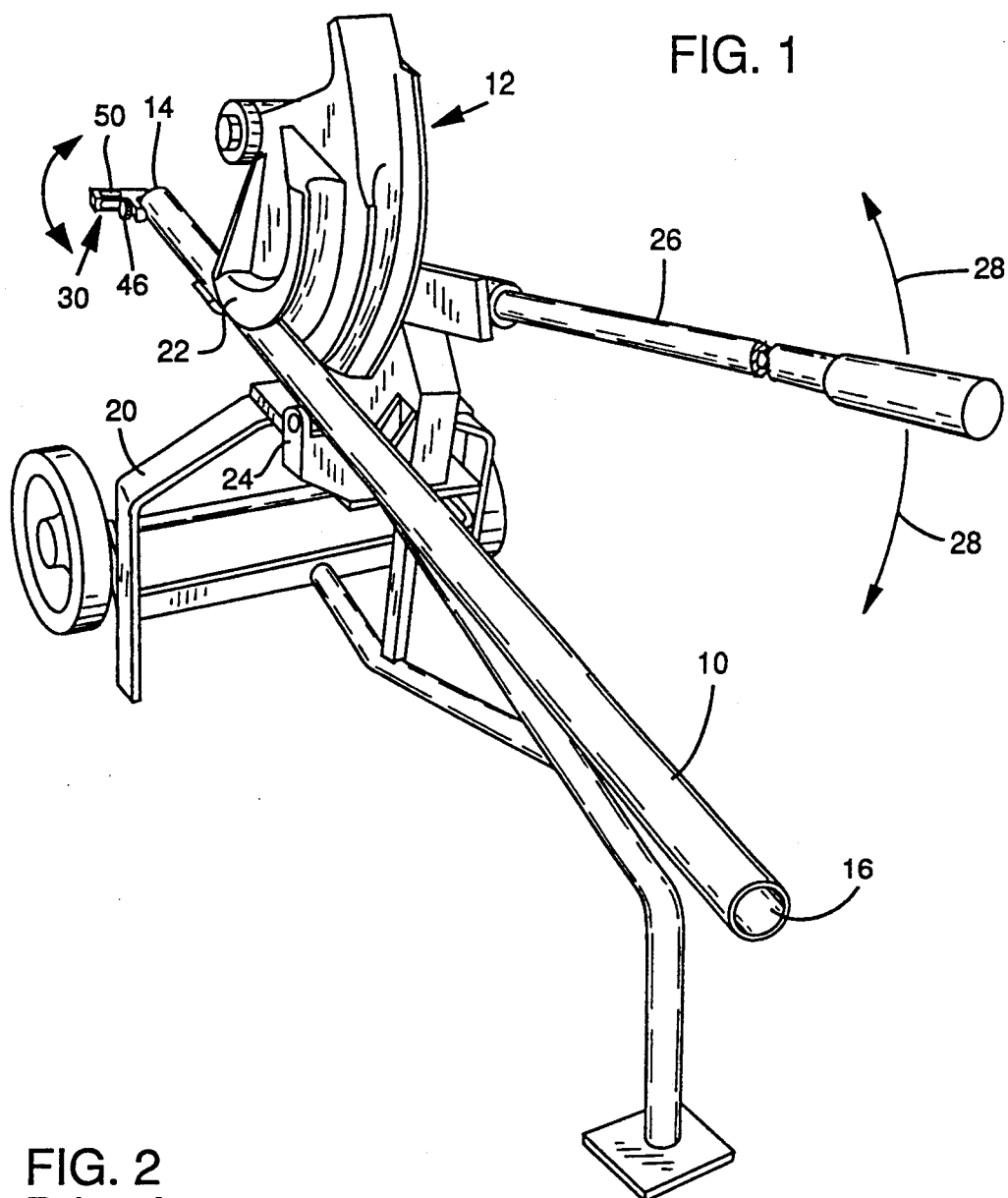
FIG. 1 is a perspective view of a mechanical conduit bending machine with a conduit mounted on the machine in position for bending and a conduit level according to the present invention mounted onto an open end of the conduit.

Referring to FIG. 1, a conduit level 30 according to the present invention is connected to a conduit 10 adjacent a first open end 14 of conduit 10 for leveling the conduit, as further described below. The conduit 10 is mounted on a mechanical conduit bending machine 12 for bending. The bending machine 12 includes a support frame 20, a concave grooved shoe 22 for receiving and bending the conduit 10 and a concave roller support unit 24 for supporting the conduit. The machine is actuated to bend the conduit by moving an extension arm 26 as indicated by arrows 28. The machine typically includes gears and ratcheting means to assist an operator bending the conduit.

During a bending operation, an operator stands alongside the conduit 10 near a second open end 16 for actuating the extension arm 26. Responsive to actuation of arm 26, shoe 22 rotates clockwise (as viewed in FIG. 1), bending the conduit 10 such that open end 14 moves upward generally within a vertical plane.

Figure 3:
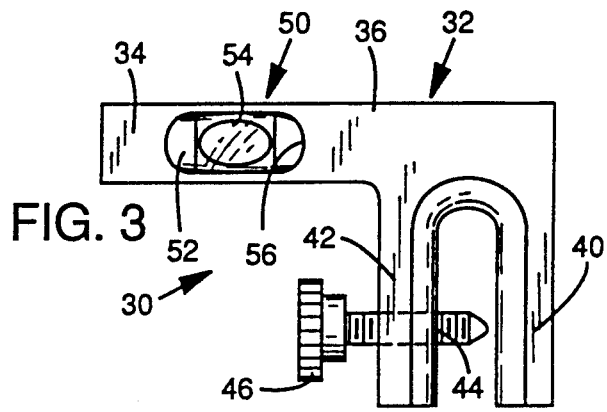
FIG. 3 is a side view of the conduit level of FIG. 1.

Referring to FIG. 3, conduit level 30 generally comprises a rigid F-shape frame 32 including a pair of legs 40 and 42 for connecting the conduit level to the conduit and a bubble level indicator 50 for rotationally orienting the conduit in the bending machine. Frame 32 includes a base member having a bottom end portion 34, an intermediate portion 36 and a top end 38. The first leg 40 is fixed to the base member adjacent top end 38 and extends perpendicular to the base member. The second leg 42 is fixed to the base member adjacent the intermediate portion 36 and extends parallel to the first leg 40 and spaced apart therefrom for receiving a terminal portion of the wall of the conduit between the first and second legs. The frame 32 is formed of a lightweight, sturdy material, preferably machined aluminum, although a suitable polymeric material could be substituted.

The bubble level indicator 50 is housed within the bottom end portion 34 of the base member. When the conduit level 30 is connected to an open end of a conduit, the bubble level indicator 50 is spaced apart from the open end so as to be unobscured by the second leg 42 and the intermediate portion 36 of the base member when viewed from an operator's position along the conduit.

Figure 2:
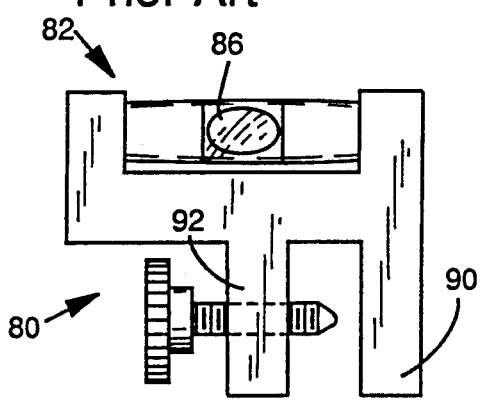
FIG. 2 is a side view of a prior art conduit level.

FIG. 2 depicts a conduit level 80 that is known in the prior art. Prior art level 80 generally comprises a rigid frame 82 including a pair of legs 90, 92 for connecting the device to a conduit, and a bubble level indicator 86. Frame 82 defines a U-shape support for bubble level indicator 86. The bubble level indicator 86 comprises a transparent cylindrical vial containing a fluid and a bubble. The vial is adhered at each end to the frame 82.

FIG. 4 is an enlarged perspective view of the conduit level 30. The conduit level is connected to the end portion 14 of conduit 10, shown in phantom. The bubble level indicator 50 includes a transparent cylindrical vial 52 containing a fluid and a bubble 54. Markings 53 may be provided on the vial 52, spaced apart by a distance slightly greater than the length of the bubble and defining a central portion of the vial to guide an operator in centering the bubble. The vial 52 defines a longitudinal vial axis indicated by dashed line 63 in FIG. 7.

The bubble level indicator 50 is housed within the bottom end portion 34 of the base member to protect it from impact. The bottom end portion 34 of the frame includes four rectangular faces arranged in a square prism shape. A cylindrical bore, shown by dashed line 55, extends into the bottom end portion from an exposed end 59. The bore is sized to receive the vial 52 axially inserted into the bore from exposed end 59 to protect the vial from impact. After the vial 52 is placed in the bore, the exposed end of the bore is plugged. The frame lower portion 34 thereby surrounds the vial except for one or more viewing windows 56.

At least one and preferably four viewing windows 56 are formed in the frame lower portion 34 to allow viewing the bubble level indicator 50 while protecting it from damage. The viewing windows are labeled "A" through "D" in FIG. 5. These windows allow viewing the vial from the operator's position when the conduit level is rotated about the vial axis relative to the operator's position, as occurs when the conduit is bent.

The prior art conduit level 80, as shown in FIG. 2, leaves the vial fully exposed on three sides, i.e., from all directions except along the frame member 82. The bubble level indicator vial therefore is subject to breakage. The prior art vial also is subject to being knocked out of alignment relative to the frame 82.

The conduit level 30 is connected to conduit 10, as illustrated in FIG. 4, by positioning the conduit level so that first leg 40 extends axially into the open end 14 of the conduit 10. A terminal portion of the wall of the conduit thus is received between the first leg 40 and the second leg 42. A clamping member 44 having a handle 46 adjustably extends through the second leg 42 toward the first leg 40. Preferably, a threaded bore extends through the second leg 42, sized to receive the clamping member 44. By advancing the clamping member 44 toward the first leg 40, the clamping member contacts the conduit wall and urges it against the first leg, thereby connecting the conduit level to the conduit.

The first leg includes a convex mounting surface 48 shaped to fittingly engage the interior surface of the conduit wall. The convex mounting surface 48 assists in guiding the conduit level 30 into alignment such that the vial axis 63 extends perpendicular to the central axis of the conduit.

FIG. 5 is a cross-sectional view of the conduit level 30 taken along lines 5—5 of FIG. 4. The bubble level indicator vial 52 is visible from all four viewing directions, i.e. through windows A through D. The vial is obscured only by the narrow struts 34 defining the viewing windows. A portion of the second leg 42 is shown in this figure, but it does not obstruct the view of the vial 52 because the vial is laterally spaced apart from the leg 42, as best seen in FIG. 7.

Referring to FIG. 6, the prior art level 80 is shown in a cross section taken through the center of the bubble level indicator. Dashed lines 88 delineate the field of view of the bubble level indicator vial. In use, the vial cannot be seen from the range of angles indicated by arrow 89 because the frame 82 creates a blind spot from the operator's position alongside the conduit.

The effect of the blind spot in use is illustrated in FIG. 8. Referring to FIG. 8, the prior art conduit level 80 is shown in end view, connected to a conduit 10. This view is taken generally alongside conduit 10 from a position remote from the open end 14 of the conduit. That is the operator's perspective. As illustrated in FIG. 8, the bubble level indicator of the prior art device is not visible from the operator's position.

OPERATION

Use of the conduit level 30 in bending an offset in the conduit 10 is next described. Preliminarily, the conduit is measured and appropriate calculations are made to determine the precise locations and angles of the required bends. Details of such calculations are known and may be found in the *Conduit Bending Handbook* published by Greenley Textron, Inc./Subsidiary of Textron, Inc., Rockford, Ill., Document IM-787. The conduit 10 is marked to indicate the correct locations for proper placement of the conduit in the bending machine.

To begin, conduit 10 is positioned in the first indicated location in the bending machine 12. The operator connects the conduit level 30 to conduit 10 adjacent the open end 14, as shown in FIG. 1. Then the operator "levels" the conduit by rotating it about its longitudinal axis so that the bubble 54 in the bubble level indicator 50 is substantially centered in the viewing window 56. This initial leveling step may be done from a position adjacent the conduit level or from an operator's position alongside the conduit in reach of the extension arm 26.

The operator then actuates the extension arm to bend the conduit. Before and during the first bending operation, the operator observes the bubble level indicator along the first end portion of the conduit from the operator's position. The indicator vial is viewed through window "A" (FIG. 5). This enables the operator to precisely maintain the rotational orientation or "level" of the conduit, and correct it if necessary, without leaving the operator's position.

Bending the conduit moves the open end 14 along an arcuate path upward and toward the bending shoe 22. As the conduit level 30 moves along with the open end 14, the conduit level is rotated about the vial longitudinal axis 63 (FIG. 7) through an angle equal to the conduit bend angle. When the conduit bend angle is substantial, for example greater than 45 degrees, the bubble level indicator comes into the operator's view through window B (FIG. 5).

See FIG. 9(a), in which reference numeral 19 represents the operator's eyes.

After the first bend is completed, the operator repositions the conduit in the bending machine 12 into position for the second bend, as indicated by the markings on the conduit. To form an offset, the second bend must be equal in magnitude and opposite in direction to the first bend. Accordingly, without disturbing the conduit level 30 from its initial position on the conduit, the operator rotates the conduit 180 degrees, repositions the conduit longitudinally to the second position indicated by the markings on the conduit, and again levels it by observing the bubble level indicator (through window B) along the first end portion. See FIG. 9(b). This repositioning may be accomplished from the operator's position. Finally, the operator performs the second bend.

Figure 9:
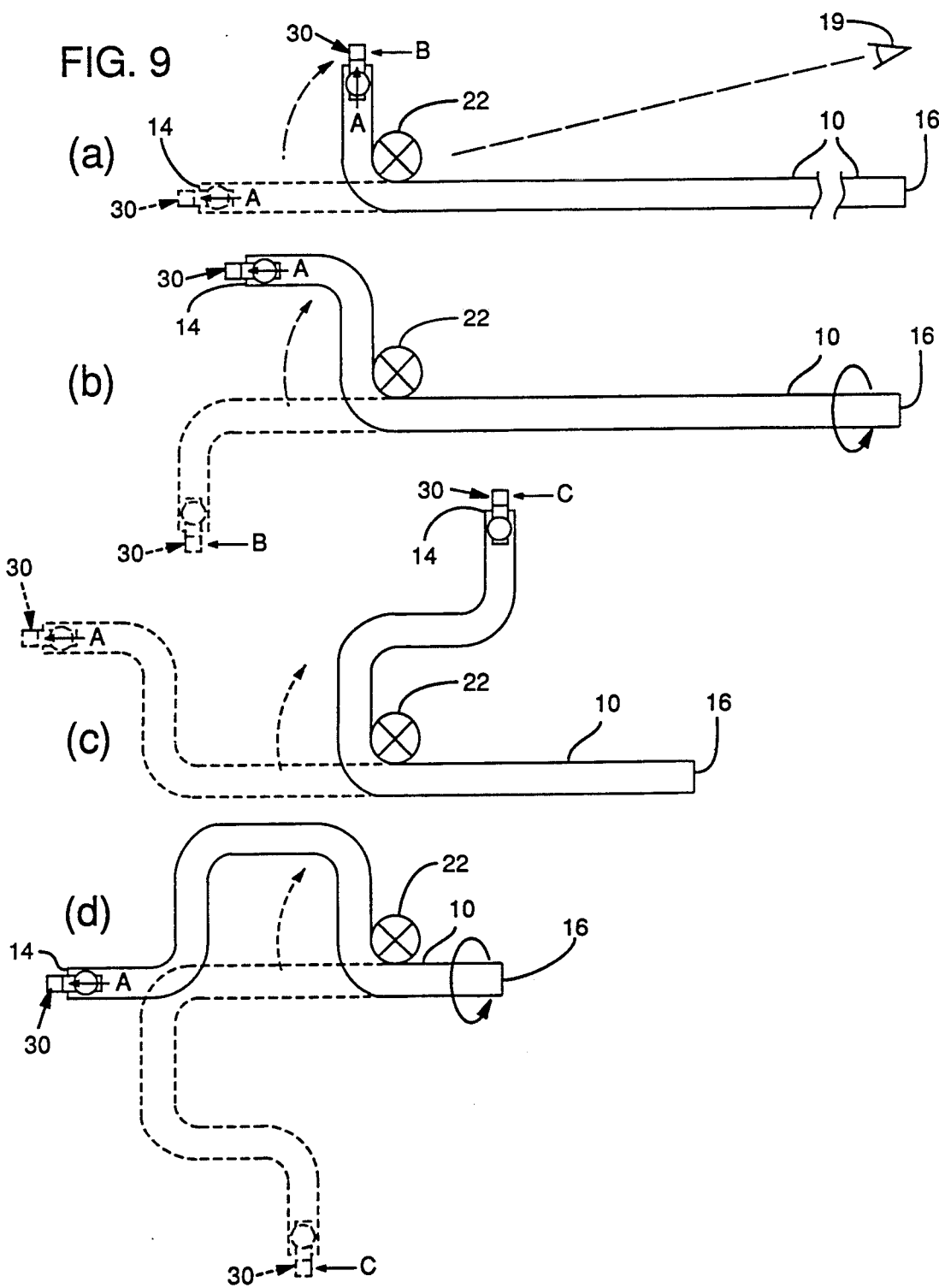
FIGS. 9a-d illustrate a method of bending a conduit to form a saddle using the conduit level of FIG. 4 and a bending machine of the type shown in FIG. 1.

The steps of forming a saddle are illustrated in FIG. 9.

To form a saddle, for example with 90 degree angles, the level indicator is initially viewed through window A from the operator's position, as in bending an offset. The first bend brings the level indicator into view through window B as shown in FIG. (a). The conduit is inverted (rotated 180 degrees) and repositioned, the level indicator remaining in view through window B. The second bend brings the level indicator back into view through window A. See FIG. 9(b). The conduit is then repositioned longitudinally but not inverted. The third bend brings the level indicator into view through window C as shown in FIG. 9c). The conduit is again inverted and repositioned, the level indicator remaining in view through window C. Finally, the fourth bend brings the level indicator back into view through window A. See FIG. 9(d).

Throughout the foregoing steps of bending a saddle, the level indicator remains in view of the operator from an operator's position within reach of the extension arm. Prior to each bending step, the operator checks the conduit for "level" and rotates the conduit if necessary to correct its rotational positioning, without leaving the operator's position.

FIG. 8 shows the prior art conduit level 80 connected to a conduit 98. Level 80 is shown in an end view taken alongside the conduit 98. Here, the frame 82 of the prior art conduit level obscures the bubble level indicator 86 so that it cannot be seen by the operator from the operator's position. Accordingly, the operator must move to an initial position adjacent the open end where the conduit level is connected to the conduit, in order to level the conduit. The operator then moves around the machine to the operator's position to form the first bend; returns to the initial position adjacent the conduit level to adjust the conduit for the second bend, and again walks around the bending machine to the operator's position to perform the second bend. Additional back-and-forth steps are required to form a saddle. While the operator is in transit or executing a bend, any shift or jarring of the conduit that rotates it out of position would go undetected by the operator, since the bubble level indicator cannot be seen. In that event, an improper bend may result, rendering the conduit unusable. Valuable time and materials are wasted.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. An apparatus for use in bending a hollow, elongate conduit having an open end, the apparatus comprising:
   a generally F-shape rigid frame, the frame including:
   a base member having a bottom end portion, an intermediate portion and a top end;
   a first leg fixed to the base member, extending from the top end perpendicular to the base member; and
   a second leg fixed to the base member, extending from the intermediate portion, parallel to the first leg and spaced apart therefrom for receiving a terminal portion of a wall of the conduit between the first and second legs;
   a bubble level indicator connected to the frame for visually indicating a horizontal plane for leveling the conduit; and
   means within the bottom end portion of the base member for housing the bubble level indicator;
   the frame and housing means arranged so that, when the apparatus is connected to the conduit, the bubble level indicator is laterally spaced apart from the open end of the conduit and the housing means including means defining an aperture located within a plane perpendicular to the first and second legs so as to expose a central portion of the bubble level indicator to view along a line of sight generally parallel to the first and second legs, whereby, in use, the central portion of the bubble level indicator is visible from an operator's position generally alongside the conduit and remove from the open end.

2. An apparatus according to claim 1 wherein the bubble level indicator consists of a single cylindrical vial defining a vial axis and containing a fluid and a bubble; and the housing means includes means defining four viewing windows arranged in a square prism configuration about the vial axis, each window exposing only a central portion of the vial.

3. An apparatus for use in bending a hollow, elongate conduit having an open end, the apparatus comprising:
   a generally F-shape rigid frame, the frame including:
   a base member having a bottom end portion, an intermediate portion and a top end;
   a first leg fixed to the base member, extending from the top end perpendicular to the base member; and
   a second leg fixed to the base member, extending from the intermediate portion, parallel to the first leg and spaced apart therefrom for receiving a terminal portion of a wall of the conduit between the first and second legs;
   a bubble level indicator connected to the frame for visually indicating a horizontal plane for leveling the conduit; and
   means within the bottom end portion of the base member for housing the bubble level indicator;
   the frame and housing means arranged so that, when the apparatus is connected to the conduit, the bubble level indicator is laterally spaced apart from the open end of the conduit to allow viewing the bubble level indicator from an operator's position generally alongside the conduit remote from the open end;
   the bubble level indicator including a cylindrical vial containing a fluid and a bubble and the bottom end portion including:
   four rectangular faces arranged in a square prism shape;
   means defining a cylindrical bore extending into the bottom end portion from an exposed end thereof, sized to receive the vial axially inserted into the bore from the exposed end, to protect the vial from impact; and
   means defining apertures in at least two adjacent ones of the four faces to allow viewing the vial from a fixed position relative to the vial when the apparatus is rotated about the vial axis relative to the fixed position.

4. An apparatus for use in bending a hollow, elongate conduit having an end portion and a central axis, the apparatus comprising;
   level indicator means for indicating a reference plane;
   connecting means for removably connecting the level indicator means to the end portion of the conduit so that the level indicator means is laterally spaced apart from the conduit and the indicated reference plane passes through the central axis; and viewing means about the level indicator means for viewing the level indicator means along the end portion of the conduit, when the apparatus is connected to the conduit, from at least an operator's position generally alongside the conduit and remote from the end portion;

the level indicator means includes a transparent cylindrical vial containing a fluid and a housing means surrounding the vial;

the housing means includes a rigid member having a square prism shape defining four faces and a cylindrical bore extending into said member from an exposed end thereof and sized to receive the vial axially inserted into the bore from the exposed end; and the viewing means includes means in said member defining an aperture in each of the four faces for viewing the vial along the end portion of the conduit while bending the conduit;

whereby the housing means includes four parallel struts defined by said aperture means, extending alongside the vial and equi-angularly spaced apart around the vial.

5. A method of bending a conduit comprising the steps of:

providing a cylindrical bobble level indicator defining an indicator axis for visually indicating a reference plane;

connecting the bubble level indicator to the conduit laterally spaced apart from a first end portion of the conduit for visually observing an indication of the reference plane from an operator's position alongside the conduit and remote from the first end portion;

oriented the bubble level so that the indicator axis extends radially of the conduit;

exposing a central portion of the level to allow viewing the bubble level from the operator's position;

moving to an operator's position alongside the conduit and remote from the first end portion;

while observing the bubble level indicator along the first end portion from the operator's position, rotating the conduit about its central axis to a rotational position such that the bubble level indicator indicates the reference plane;

bending the conduit while maintaining said rotational positioning;

repositioning the conduit for a second desired bend; and repeating said rotating and bending steps from the operator's position to form the second bend so that the entire conduit remains substantially within a second plane perpendicular to the reference plane.

6. A method according to claim 5 wherein said first and second bending steps are effected to form first and second bends of substantially equal angular magnitude thereby forming an offset in the conduit.

7. An apparatus for use in bending a hollow, cylindrical conduit defining a conduit cylinder having a central axis and having an open end, the apparatus comprising:

a generally F-shape rigid frame including:

an elongate base member having lower and upper regions, the lower region having a square prism shape defining four faces; and means fixed to the upper region for clamping the frame to a terminal portion of a wall of the conduit so that the lower region of the base member extends outside the conduit cylinder and perpendicular to the center axis;

a bubble level housed within the lower region of the base member and defining a bubble level axis for visually indicating a horizontal plane for leveling the conduit;

means in the lower region of the base member defining a cylindrical bore extending into the lower region from an exposed end thereof and sized to receive the bubble level axially inserted into the bore from the exposed end for protecting the bubble level, said bubble level, in use, being laterally spaced apart from the conduit; and means in the lower region defining an aperture in each of at least two adjacent ones of the four faces to expose a central portion of the bubble level for viewing the bubble level through the apertures from a predetermined operator's position generally alongside the conduit and remote from the open end as benign the conduit varies the angular orientation of the apparatus about the bubble level axis, thereby allowing an operator to level the conduit prior to each of successive bending operations while remaining in said operator's position.

8. An apparatus according to claim 7 in which the lower region includes means defining an aperture in each of the four faces to allow viewing the bubble level from the operator's position for any angular orientation of the apparatus about the bubble level axis;

whereby the lower region includes four parallel struts defined by said aperture means, extending alongside the vial and spaced apart around the vial.

9. A method of binding a conduit comprising the steps of:

providing a bubble level mounted in a rigid frame, having a pair of viewing windows perpendicular to each other for visually indicating a horizontal plane;

connecting the frame to the conduit so that the bubble level is laterally spaced apart from a first end portion of the conduit for visually observing the bubble level through a first one of said viewing windows from an operator's position alongside the conduit and remote from the first end portion;

while observing the bubble level through said first viewing window along the first end portion from the operator's position, leveling the conduit by rotating the conduit about its central axis to a rotational position such that the bubble level indicates the horizontal plane;

bending the conduit to form a first bend while maintaining said rotational positioning;

rotating the conduit approximately 180° about its central axis to an inverted position;

axially repositioning the conduit for a second desired bend;

while observing the bubble level through the other one of said viewing windows, leveling the conduit in the inverted position; and bending the conduit from the operator's position to form the second bend so that the entire conduit remains substantially within a vertical plane.

10. A method according to claim 9 wherein the frame includes four viewing windows arranged to define a square prism about the bubble level, and further comprising the steps of:

axially repositioning the conduit for a third desired bend;

while observing the bubble level through said first one of the viewing windows along the first end portion from the operator's position, leveling the conduit;

bending the conduit to form the third bend;

rotating the conduit approximately 180° about its central axis;

axially repositioning the conduit for a fourth desired bend;

while observing the bubble level through a third one of said viewing windows along the first end portion from the operator's position, leveling the conduit; and bending the conduit to form the fourth bend, whereby the entire conduit remains substantially within the vertical plane.

11. A method according to claim 10, wherein said four bending steps are effected to form bends of equal angular magnitude thereby forming a saddle in the conduit.

12. A method according to claim 1, wherein the first leg is rectangular in cross-section thereby including four corners, each extending lengthwise so that, in use, two of the corners are urged against an interior surface of the conduit fore securing the apparatus to the conduit.

* * * * *